(12) United States Patent
Ashley

(10) Patent No.: US 6,405,890 B1
(45) Date of Patent: Jun. 18, 2002

(54) THIN FILM COVER AND METHOD OF MAKING SAME

(76) Inventor: Louis S. Ashley, P.O. Box 222, Pleasant City, OH (US) 43772

(*) Notice: Subject to any disclaimer, the term of this patent is extended or adjusted under 35 U.S.C. 154(b) by 0 days.

(21) Appl. No.: 09/239,767

(22) Filed: Jan. 29, 1999

Related U.S. Application Data

(62) Division of application No. 08/768,629, filed on Dec. 18, 1996, now Pat. No. 5,932,163.

(51) Int. Cl.7 ............................................... B65D 51/00
(52) U.S. Cl. ....................................... 220/287; 150/154
(58) Field of Search ............................... 220/287, 796; 215/319, 11.1; 150/154

(56) References Cited

U.S. PATENT DOCUMENTS

| | | | |
|---|---|---|---|
| 762,039 A | * 6/1904 | Freel | 150/154 |
| 898,975 A | * 9/1908 | Fox | 215/11.1 |
| 926,011 A | * 6/1909 | Miller | 215/11.1 |
| 2,009,629 A | 7/1935 | Mechlin | |
| 2,047,691 A | 7/1936 | Kronquest | |
| 2,064,411 A | * 12/1936 | Brandstein | 220/287 |
| 2,266,270 A | * 12/1941 | Roth | 215/319 |
| 2,368,046 A | 1/1945 | Sidebotham | |
| 2,442,179 A | 5/1948 | Shanklin et al. | |
| 2,569,852 A | 10/1951 | Green | |
| 2,770,557 A | 11/1956 | Atti | |
| 2,950,990 A | 8/1960 | Johnson | |
| 3,070,249 A | * 12/1962 | Sehrwald | 215/11.1 |
| 3,146,873 A | 9/1964 | Johnson | |
| 3,389,070 A | 6/1968 | Berghaus et al. | |
| 3,506,431 A | 4/1970 | Blanding | |
| 3,530,825 A | 9/1970 | Antonissen | |
| 3,870,015 A | 3/1975 | Brown et al. | |
| 4,101,925 A | 7/1978 | Kelley et al. | |
| 4,148,942 A | 4/1979 | Gierek et al. | |
| 4,201,149 A | 5/1980 | Koester et al. | |
| 4,392,805 A | 7/1983 | Golyak et al. | |
| 4,416,213 A | 11/1983 | Sakiya | |
| 4,434,113 A | 2/1984 | Neefe | |
| 4,590,094 A | 5/1986 | Ringer, Jr. | |
| 4,601,923 A | 7/1986 | Bonato | |
| 4,659,522 A | 4/1987 | Neefe | |
| 4,680,149 A | 7/1987 | Rawlings et al. | |
| 4,794,977 A | 1/1989 | Iversen | |
| 4,901,881 A | * 2/1990 | McElroy | 220/287 |
| 5,040,590 A | 8/1991 | Brandriff | |
| 5,098,628 A | 3/1992 | Okamoto et al. | |
| 5,129,532 A | * 7/1992 | Martin | 215/11.1 |
| 5,238,878 A | 8/1993 | Shinohara | |
| 5,250,116 A | 10/1993 | Tanimoto | |
| 5,339,981 A | * 8/1994 | Kral | 220/287 |
| 5,393,215 A | 2/1995 | Donovan, Sr. | |
| 5,453,230 A | 9/1995 | McClellan et al. | |
| 5,468,324 A | 11/1995 | Hong | |

* cited by examiner

Primary Examiner—Nathan J. Newhouse

(57) ABSTRACT

A PVC film cover is provided including a down and interned marginal portion terminating in a thickened bead, the marginal portion tapering in thickness from the bead toward the central body portion of the cover.

The cover is produced through the use of a shape-conforming mold into whose central portion liquid PVC is dispensed while the mold is rotating. The liquid PVC moves over the mold surfaces outward toward the outer marginal portion thereof by centrifugal force and rotation of the mold is terminated and the mold is quickly inverted into a downwardly opening position whereupon the excess liquid PVC at the outer periphery of the mold flows slowly down to a reversely turned edge for forming the bead of the cover. In quick succession, the mold is heated in order to gel and then harden the liquid PVC, mold is cooled and the cover is thereafter removed from the mold.

10 Claims, 11 Drawing Sheets

THIN FILM COVER AND METHOD OF MAKING SAME

CROSS-REFERENCE TO RELATED APPLICATIONS

This is a division of application Ser. No. 08/768,629 filed Dec. 18, 1996 now U.S. Pat. No. 5,932,163

STATEMENT REGARDING FEDERAL SPONSORED RESEARCH OR DEVELOPMENT

Not Applicable.

BACKGROUND OF THE INVENTION

1. Field of the Invention

This invention relates to a thin film cover constructed PVC and more specifically to a cover which is approximately 0.0025 inches in thickness throughout a major portion of its plan area, but which includes an open mouth portion defined by a considerably thickened rim or bead and an adjacent marginal portion which tapers in thickness from the bead toward the main body of the cover. Also disclosed is a preferred method for forming the cover.

2. Description of Related Art

The following prior U.S. Patents disclose articles which are coated through the use of methods which are somewhat similar to the method disclosed in the instant invention:

| | | |
|---|---|---|
| 2,009,629 | 2,047,691 | 2,368,046 |
| 2,442,179 | 2,569,852 | 2,770,557 |
| 2,950,990 | 3,146,873 | 3,506,431 |
| 3,389,070 | 3,530,825 | 3,870,015 |
| 4,101,925 | 4,148,942 | 4,201,149 |
| 4,392,805 | 4,416,213 | 4,434,113 |
| 4,590,094 | 4,601,923 | 4,659,522 |
| 4,680,149 | 4,794,977 | 5,040,590 |
| 5,098,628 | 5,238,878 | 5,250,116 |
| 5,393,215 | 5,453,230 | 5,468,324 |

However, the coated articles disclosed by the above-noted patents, the articles formed in part by coating and the methods involved in the above-noted prior patents are not equivalent to the article of the instant invention or the method utilized in forming the article.

SUMMARY OF THE INVENTION

The article of the instant invention is similar to the apparatus or lid disclosed in U.S. Pat. No. 4,901,881 in that it is designed for use as a closure. However, U.S. Pat. No. 4,901,881 discloses a closure formed of a latex elastomeric material and which must be formed utilizing a method which is considerably different from the method by which the closure of the instant invention is formed.

The cover of the instant invention is formed of polyvinyl chloride compounded to provide a material which is highly flexible, relatively non-flammable, hard-wearing and resistant to water and corrosion. Polyvinyl chloride is an ethanoid polymer produced as a fine white powder by both emulsion polymerization and suspension polymerization of the gas, vinyl chloride, when liquified under nitrogen pressure. The terms "PVC" and "vinyl" are commonly used with reference not only to the polymer, but to all materials of which polyvinyl chloride is a constituent. PVC composition are prepared by hot mixing the polymer with plasticizers and small proportions of stabilizers, stearate lubricants, and coloring materials to give materials of a wide range of hardness, from rigid (with little or no plastizer) to very soft (equal proportions of plastisizers and polymer), and in a wide range of colors, as well as crystal clear.

The polyvinyl chloride utilized in producing the cover or article of the instant invention is termed as a plastisol thermosetting plastic. Once compounded, plastisols need heat to transform them into a solid. They usually are placed in molds and as the heat increases, the plastisol passes from a liquid, through a gel phase and finally becomes a solid. Heat is then continued to cure the solid mass and give it its final properties.

The latex elastomeric material utilized in producing the cover disclosed in U.S. Pat. No. 4,901,881 may have minute particles of latex rubbed therefrom by friction and there are many potential environmental uses for a flexible cover and the like for which a latex elastomeric material is not desirable because of the possibility of contamination by minute particles of latex rubber when covers of this material are used.

Plastisols, on the other hand, when properly compounded and cured, are reasonably elastic, highly tear-resistant, pliable, and relatively soft to the touch without being excessively resilient. It is also pointed out that the polyvinyl chloride cover of the instant invention may be formed in generally one-half the time required to form a similar cover constructed of a latex elastomeric material, in that the latex elastomeric material requires a considerably longer curing time.

The main object of this invention is to provide a flexible cover which will have many uses.

Another object of this invention, is to provide a flexible cover which will be at least somewhat elastomeric, thereby enabling a cover, such as that produced for covering an open top container, to be manufactured in different sizes but capable of being usable to cover not only specific sizes of containers but also containers of at least slightly varying sizes.

Another important object of this invention, to provide a cover of the thin film type which may be reliably produced, without "pinholes".

Still another object of this invention is to provide a flexible thin film cover incorporating not only a molded thickened peripheral bead (as opposed to a rolled bead) but also an outer marginal portion immediately adjacent the thickened bead which tapers gradually toward the main central body portion of the cover, to thereby provide an outer peripheral portion of the cover which may be more securely sealed relative to an associated container.

Another object of this invention is to provide a flexible, film-type cover which may be readily molded against a concave mold surface.

Still another object of this invention is to provide a flexible, thin-film cover which may be individually produced over a considerably shorter time period than a similar cover constructed of latex rubber material.

Another object of this invention is to provide a method of manufacturing the cover of the instant invention which incorporates not only centrifugal force but also gravity in a manner such that the main body of the cover is of a substantially constant thickness, the open mouth of the cover is defined by a thickened reinforcement bead and a peripheral zone of the cover immediately adjacent the reinforcement bead gradually tapers in thickness from the bead toward the central body portion of the cover.

A final object of this invention to be specifically enumerated herein is to provide a cover which will conform to conventional forms of manufacture, be useable in numerous environments, be resistant to light abrading independent of minute particle deterioration and reliable throughout a wide range of usage.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 14 is removed therefrom.

DESCRIPTION OF THE PREFERRED EMBODIMENTS

Figure 1:
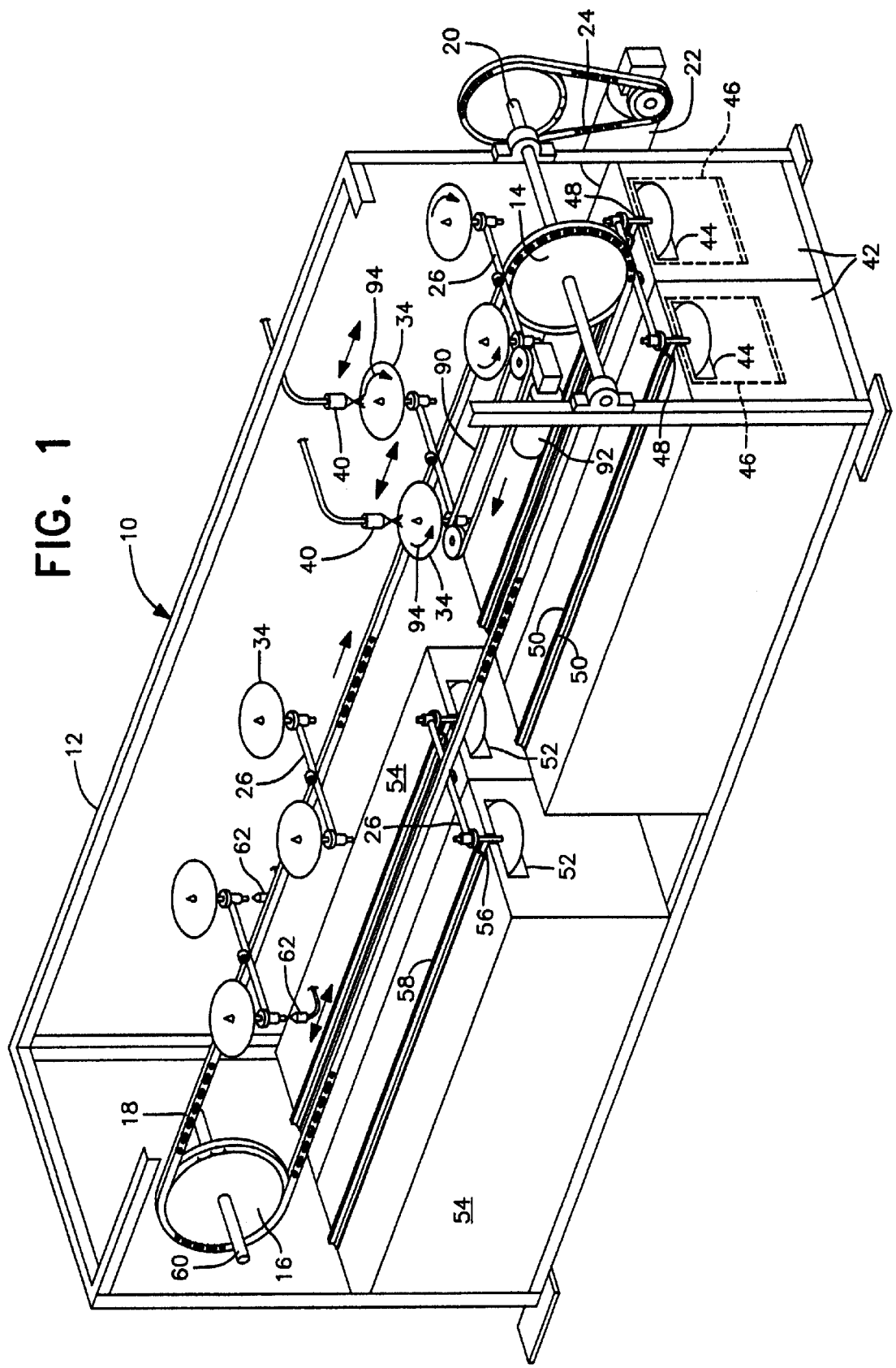
FIG. 1 is a schematic perspective view of an apparatus, includes a conveyor system, for carrying out the method of the instant invention for producing a flexible PVC closure or cover.

Referring now more specifically to the drawings, the numeral 10 generally designates a machine or apparatus by which the several products disclosed hereinafter may be produced. The apparatus 10 includes a framework 12 from which powered and idle sprockets 14 and 16 are journaled. A conveyor chain 18 is trained over the sprockets 14 and 16 and the sprocket 14 is mounted on a power shaft 20 driven by a gear head motor 22 through a drive chain 24.

Figure 2:
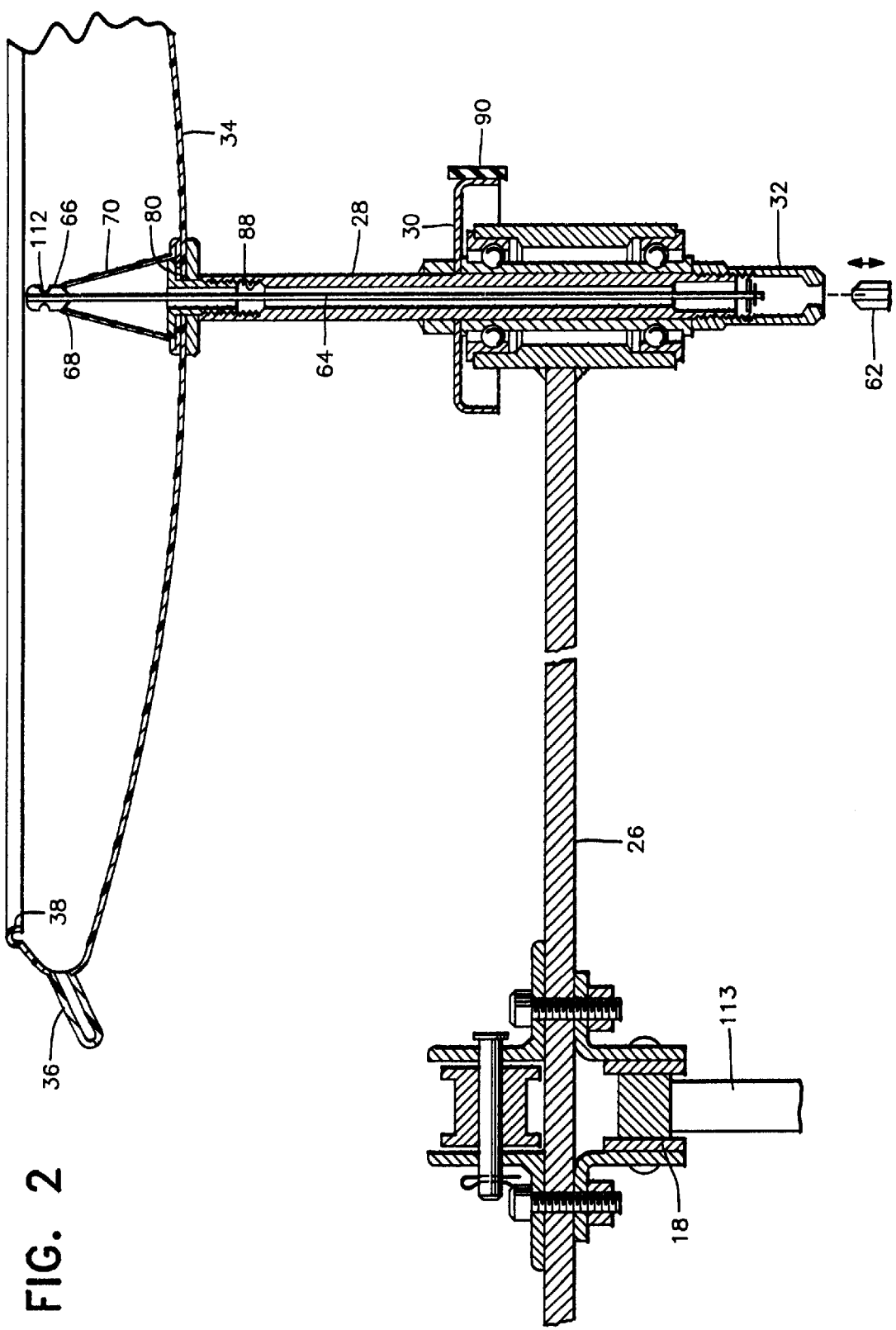
FIG. 2 is an enlarged fragmentary transverse vertical sectional view, illustrating the support chain of the conveyor, a portion of one of the mounting brackets supported from the support chain and a rotary concave mold supported from one end of the support bracket.

The conveyor chain 18 supports 12 transverse support arms 26 therefrom (only 5 support arms 26 being shown). The opposite ends of each support arm 26 support a rotary spindle 28 which is tubular, and each spindle 28 includes a drive pulley 30 to be hereinafter more fully set forth. One set of ends of the rotary spindles 28 include air inlet nipples 32 and the other set of ends of the spindles 28 include molds 34 supported therefrom. A mold 34 fragmentarily illustrated in FIG. 2 is generally in the form of an inverted pot cover with a slightly revised (inwardly rolled) mouth rim 38. In addition, at least one peripheral portion of the outer margin of the mold 34 is provided with a tubular nipple 36 which is open at its inner end and closed at its outer end, the rolled mouth rim 38 of the mold 34 serving a purpose hereinafter more fully set forth.

As the molds 34 move along the upper and lower reaches of the chain 18, the molds 34 first move into registry with downwardly directed PVC discharging nozzles 40 and then pass about the shaft 20 and swing (in inverted positions) into heating housing 42 extending beneath the lower reaches of the chain 18. The molds 34 enter the heating housings 42 through slots 44 having flexible flaps 46 removably closing the inner ends thereof. In addition, the top walls of the heating housings 42 have slots 48 formed therein through which the rotary spindles 28 are snugly received, the slots 48 having flexible seals 50 operatively associated therewith and between which the rotary spindles 28 are received. The ends of the housings 42 remote shaft 20 are provided with flexible flaps similar to the flaps 46 but which are mounted on the exterior of the heating housings 42.

As the spindles 28 exit the heating housings 42 they pass inwardly through slots 52 formed in cooling housings 54 and the cooling housings 54 are also provided with slots and seals 56 and 58 corresponding to the slots 48.

After exiting the ends of the cooling housings 54 remote from the heating housings 42, the spindles 28 pass about the shaft 60 from which the idle sprocket 16 is mounted and move into registry with air discharge nozzles 62, which nozzles 62 may be mounted for limited movement longitudinally of the frame 12 and spring biased (in any convenient manner) toward the end of the frame 12 remote from the heating housings 42. The movement of the air discharge nozzles 62 longitudinally of the frame 12 will be effected by any suitable spring biased latch or the like mounted on the structure (not shown) which supports the air discharge nozzles 62 for longitudinal movement of the frame 12 and which is engaged by each support arm 26 as it moves from the shaft 60 end of the frame 12 toward the shaft 20 end of the frame 12. In this manner, the air discharge nozzles 62 will register and move with each spindle for a short distance of its movement along frame 12 and then turn to the start position thereof adjacent the shaft 60 end of the frame 12. While the nozzles 62 are registered and move with the spindles 28 air from the nozzles 62 is directed upwardly into the air inlet nozzles 32 of the rotary spindles 28.

The interior of each rotary spindle 28 includes a downwardly spring biased valve stem 64 and the upper end of each valve stem 64 includes a valve head 66, see FIG. 2, seatable with the seat 68 defined at the upper end of a hollow conical form 70 supported within the center of each mold 34 through the utilization of a unique bolt and washer assembly including a shouldered bolt 72 and a non-circular washer 74 having a square central opening 76 formed therein.

The shouldered bolt 72 includes a circular shoulder 78 rotatably received through the center opening 80 formed in the mold 34 and a square shoulder 82 receivable through the square opening 76. Thus, even though the bolt 72 includes a circular head 86 snugly received within the lower end of the conical form 70, suitable torque applying tools may be applied to the exterior of the washer 74 in order to rotate the same and thus tighten the bolt 72 within the threaded counter-bore 88 formed in the upper end of the spindle 28.

With attention now invited more specifically again to FIG. 1, it may be seen that a drive belt 90 is driven by a gear motor 92 and that the drive belt 90 has one reach thereof disposed for engagement by the drive pulley 30 of each spindle 28 as that spindle approaches the shaft 20 end of the frame 12. Only the right-hand belt 90 is illustrated in FIG. 1, but the left-hand belt 90 is illustrated in FIG. 2.

Figure 9:
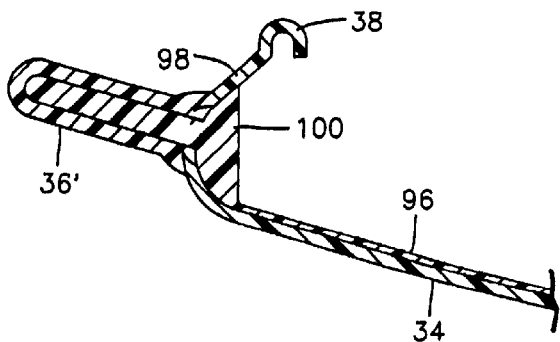
FIG. 9 is a fragmentary vertical sectional view illustrating one peripheral portion of the mold with the PVC material therein during spinning.
Figure 10:
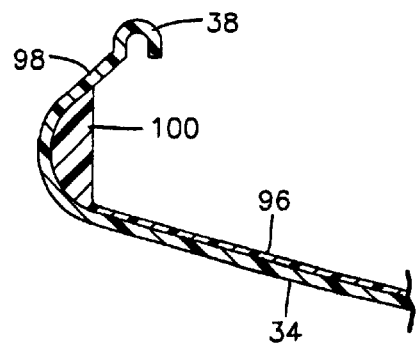
FIG. 10 is a fragmentary vertical sectional view of the opposite peripheral portion of the mold illustrated in FIG. 9.
Figure 11:
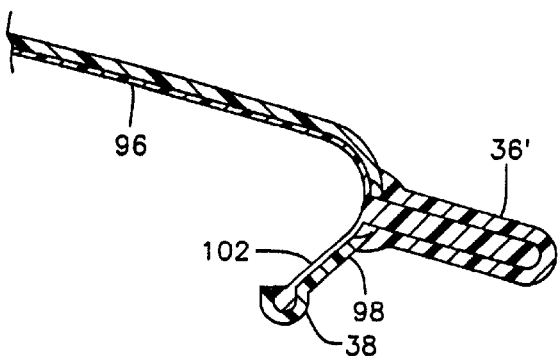
FIG. 11 is a fragmentary vertical sectional view of the structure in FIG. 9 in inverted position and subsequent to termination of rotation of the mold.
Figure 12:
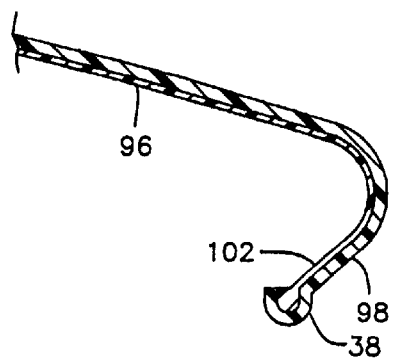
FIG. 12 is a fragmentary vertical section view of the structure illustrated in FIG. 10 in inverted position and subsequent to termination of rotation of the mold.

With attention now invited to FIGS. 1, 2 and 5–8, as a pair of molds 34 move into registry with the nozzles 40 the corresponding drive pulleys 32 engage the belts 90 and cause the molds 34 to rotate in the manner indicated by the arrows 94 in FIG. 1. At substantially the same time, the nozzles 40 downwardly discharge the plastisol or liquid PVC downwardly upon the corresponding forms 70. Plastisol quickly flows by gravity downwardly along the form 70 and as rotating molds 34 move further toward the shaft 20 end of the frame 12, the nozzles 40 apply additional plastisol between the form 70 and rolled rim 38 of each mold 34 registered with a nozzle 40. Then, the discharge of plastisol from the nozzles 40 is terminated. The plastisol, designated by the reference numeral 96, and because of the rotation of the molds 34, is spun outwardly into the outer rims 98 of the molds 34. Because of surface tension, the plastisol 96 forms only a thin film (approximately 0.0025 inches) over the main body portion of the inner surface of the mold 34, and the remainder, or excess, of the plastisol 96 collects in the rim 98 in the manner illustrated at 100 in FIGS. 9 and 10. The plastisol 96 fully fills the interior of the nipple 36' illustrated in FIG. 9 (note that the nipple 36' of FIG. 9 is inclined oppositely relative to the nipple 36 illustrated in FIG. 2). When a support arm 26 supporting a pair of molds 34 passes about the shaft 20 to invert the molds 34 and the inverted molds move into the heating housings 42, the molds 34 have ceased to rotate and the collected plastisol at 100 flows by gravity down into the rolled rim 38 in the manner illustrated in FIGS. 11 and 12. However, because rotation of the molds 34 has terminated, the plastisol collected at 100 tends to flow down the inverted rims 98 of the molds 34 in a manner such that the thickness of the plastisol tapers upwardly away from the inverted rims 38 in the manner illustrated at 102 in FIGS. 11 and 12, the interior of the nipple 36' remaining full of plastisol 96. However, if a mold 34 is used with an oppositely inclined tubular nipple such as that indicated at 36 in FIG. 2, when the mold 34 is inverted the nipple 36 will be upwardly and outwardly inclined and the excess plastisol spun into the interior of the nipple 36 when the mold 34 is upright and being spun by the belt 90 will drain therefrom when the mold 34 is inverted and before it moves into the heating housing 42 so as to provide a tubular article nipple, opening into the interior of mold 34.

When the mold drive pulleys 30 are engaged with the belts 90, the molds 34 are rotated at approximately 670 rpm. Furthermore, the chain 18 moves about 3 feet per minute. Also, the interior temperature of the heating housings 42 is approximately 370° F. and the heating housings 42 are approximately 6 feet in length. Thus, the molds 34 remain within the heating housings for approximately two minutes, thereby enabling the molds 34 and the plastisol to reach curing temperatures of approximating 370° F. This curing temperature is sufficient to transform the plastisol into a solid and immediately upon moving from the discharge ends of the heating housings 42 the molds 34 move into the cooling housings 54 in which cool air is directed upon the molds 34 in order to reduce their temperature to approximately 120° F. Upon exiting the ends of the cooling housings 54 remote from the heating housings 42 the molds 34 move about the shaft 60 into positions registered the air inlet nozzles 32 and air under pressure is discharged from the nozzles 62 into the air inlet nozzles 32 whereupon the valves stems 64 are upwardly displaced to elevate the valve heads 66 upwardly from the seats 68 and to allow air under pressure to enter the mold 34 beneath the center portion of the cover or article 106 (see FIG. 8) in order to upwardly displace the center portion of the cover 106 from the mold 34. Then, a hand-held or machine positioned implement 108 may be used to break one peripheral portion of the bead 110 of the cover 106 from the rolled rim 38 of the mold 34. It will be noted from FIG. 2 that the valve head 66 includes a peripheral groove 112. The groove 112 is provided in order that the center conical portion of the cover or article 106 initially formed over the hollow conical form 70 will partially interlock with the valve head. Then, when the cover 106 is initially forced from the mold 34 by the air under pressure being admitted into the mold under the cover 106, the center conical portion 107 of the cover or article 106 will be turned inside-out such that the conical portion 107 is disposed to the exterior of the cover 106 as opposed to the interior of the cover, as originally formed.

Figure 3:
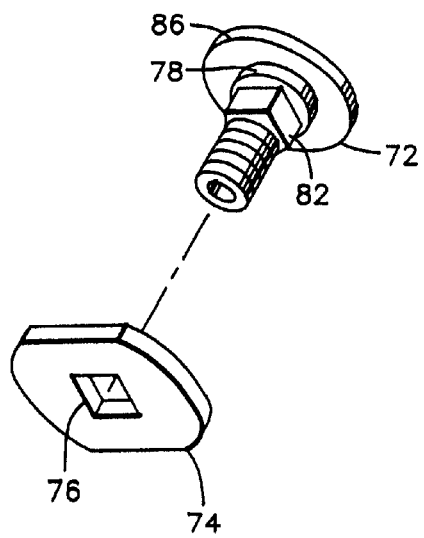
FIG. 3 is a exploded perspective view of an attaching assembly by which the mold illustrated in FIG. 2 is mounted from the rotary support therefore.
Figure 4:
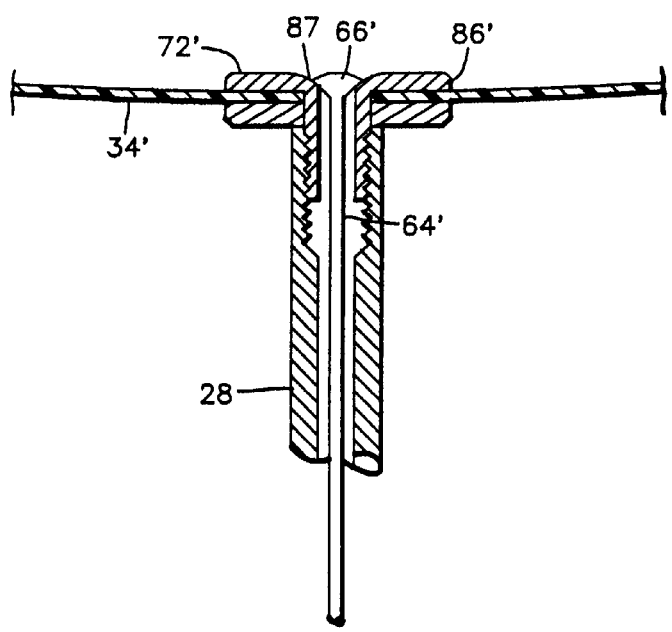
FIG. 4 is a fragmentary enlarged vertical sectional view illustrating a modified form of air valve for the mold.
Figure 5:
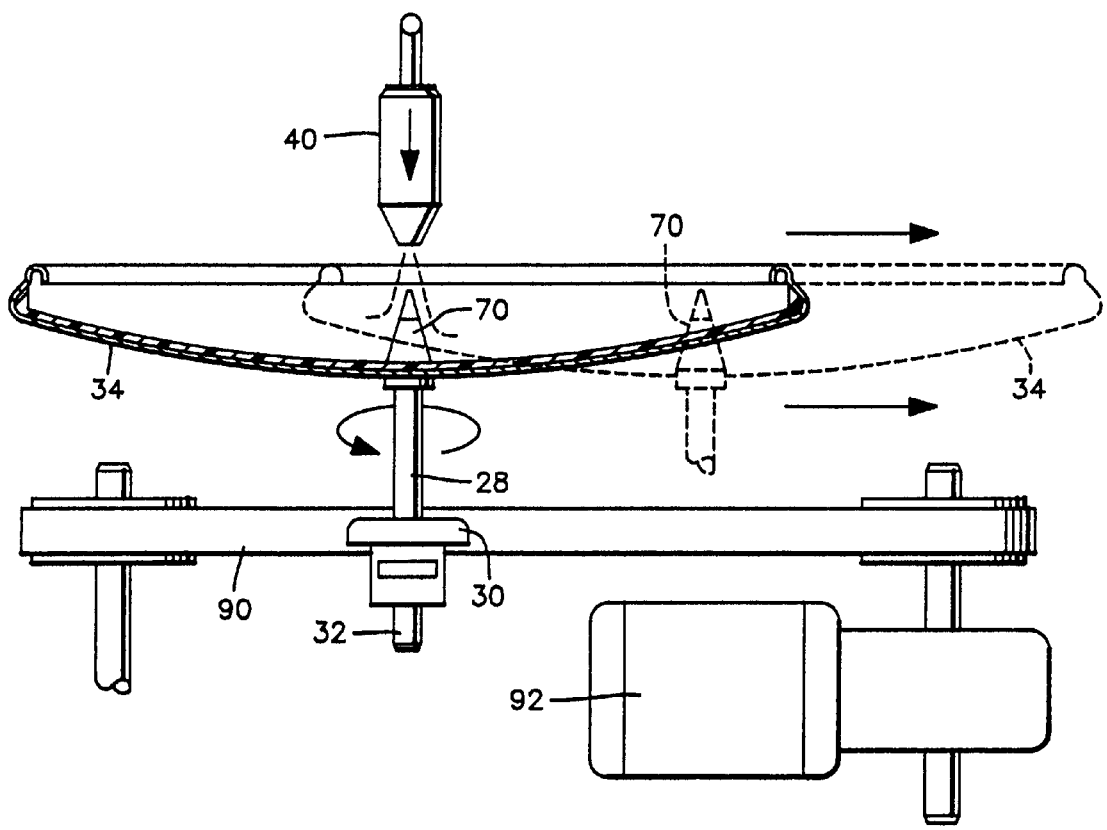
FIG. 5 is a front schematic view illustrating the manner in which liquid PVC may be introduced into the mold as the latter is being spun.
Figure 6:
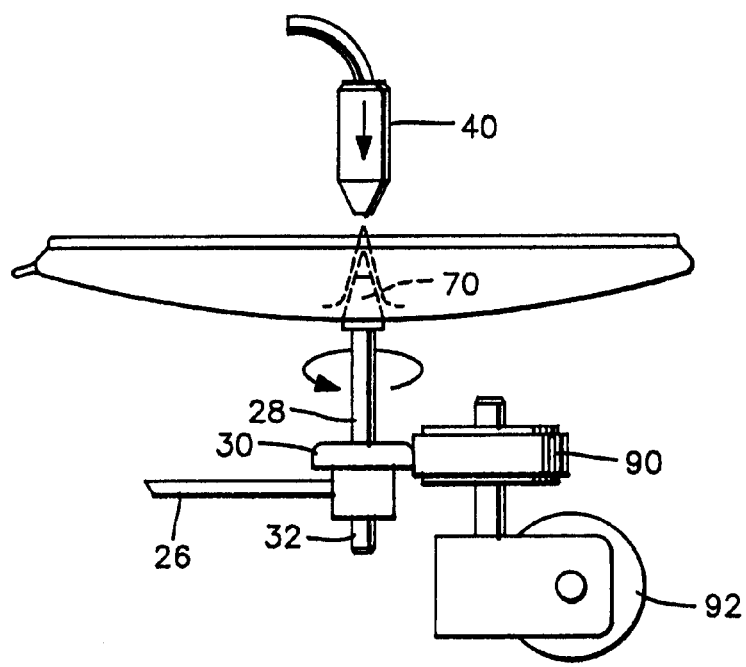
FIG. 6 is a side schematic view of the structure illustrated in FIG. 5.
Figure 7:
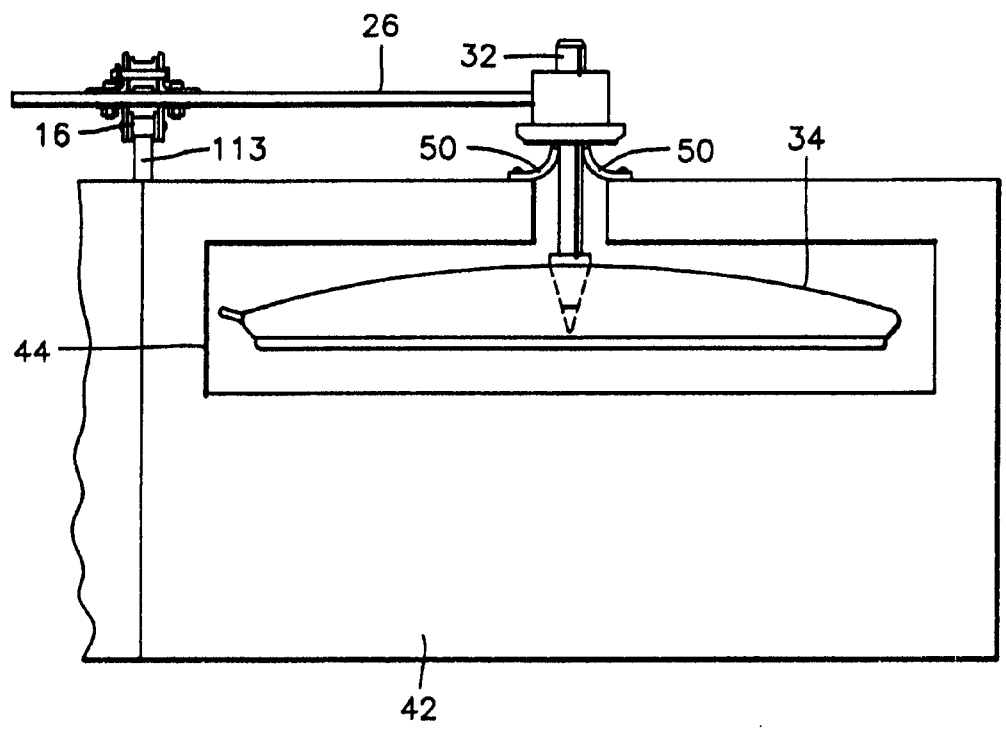
FIG. 7 is an end schematic view of one of the inverted rotary molds as it moves through the heating housing.

With attention now invited more specifically to FIG. 4, the mold 34' illustrated in FIG. 4 is identical to the mold 34, but the bolt and washer assembly illustrated in FIG. 3 are used without the hollow conical form 70 and outer side of the head 86' of the shouldered bolt 72' is contoured as at 87 in order to form a seat for the modified valve head 66' carried by the upper end of the modified valve stem 64' illustrated in FIG. 4. Thus, when a cover or article similar to the article 106 is removed from the mold 34' the cover or article thus removed does not include the conical portion 107 of the cover 106.

With attention again invited to FIG. 2, the upper reach of the chain 18 is supported from and rides along a support guide 113 (not shown in FIG. 1) and the support arms 26 each include a roller 114 journaled therefrom which rollingly engage a similar support guide (not shown) mounted beneath at the lower reach of the chain 18.

Figure 13:
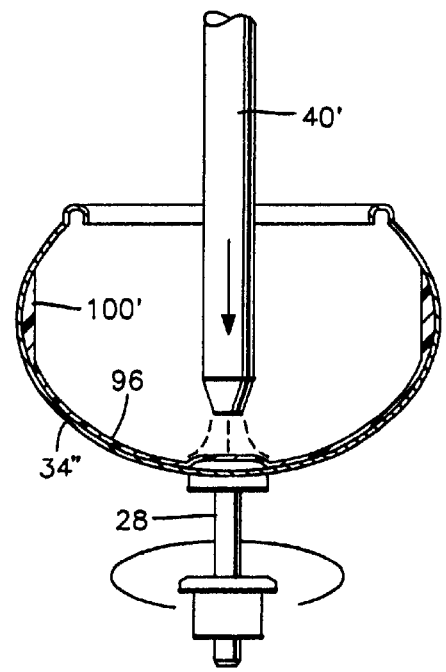
FIG. 13 is a schematic sectional view, illustrating the manner in which PVC material may be applied to the concave inner surfaces of a rotating dome-shaped mold.
Figure 14:
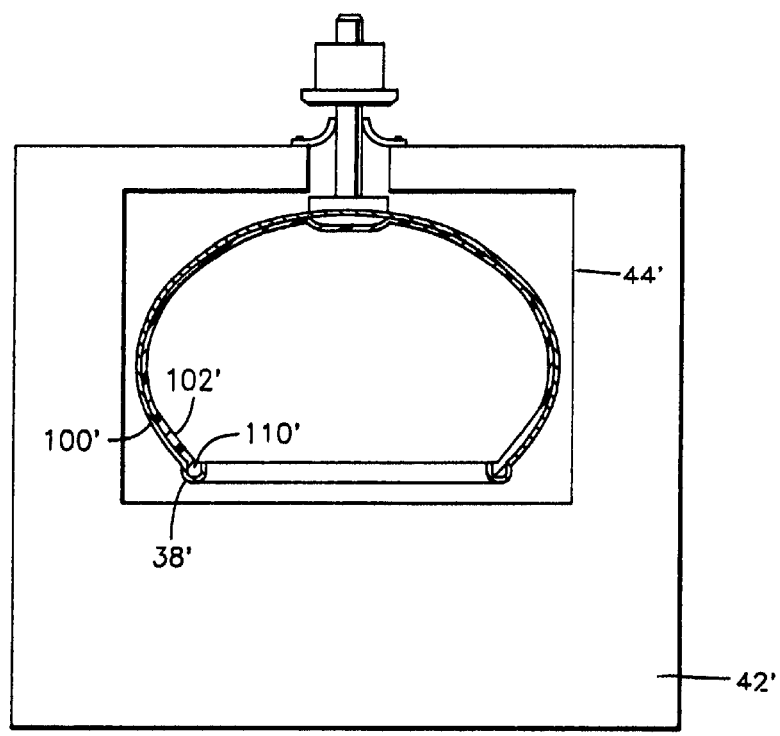
FIG. 14 is a schematic sectional view, illustrating the mold structure of FIG. 13 in inverted position and subsequent to termination of rotation of the mold and as it is moving through the heating housing.
Figure 15:
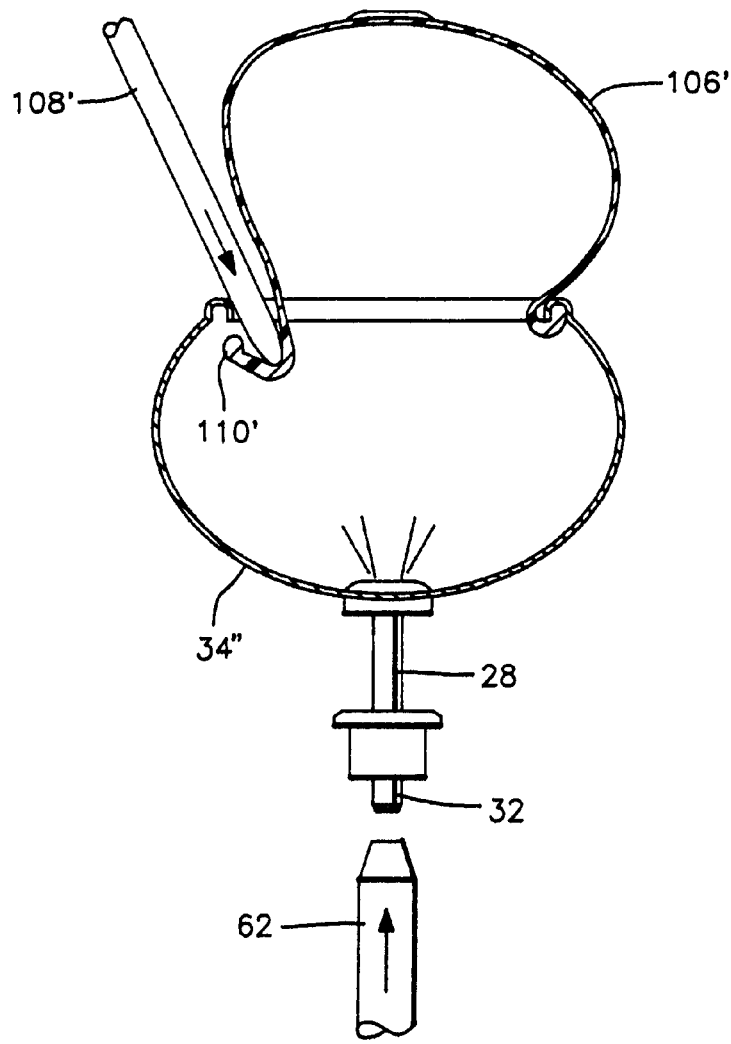
FIG. 15 is a vertical sectional schematic view, illustrating the manner in which the article or closure within the mold illustrated
Figure 16:
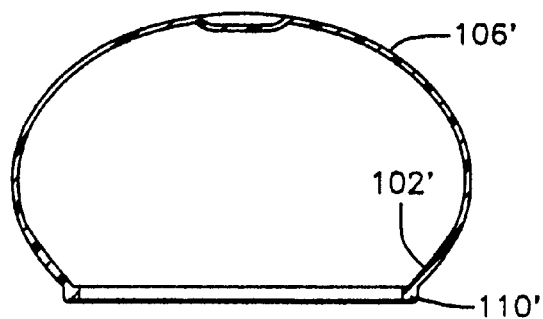
FIG. 16 is a vertical sectional view of the article illustrated in FIGS. 14 and 15 after having been removed from the mold.

Referring now more specifically to FIG. 13, there may be seen a modified form of mold 34" supported from a spindle 28 in the same manner the mold 34' is supported from the spindle 28 in FIG. 4. The mold 34" is very similar to the mold 34, but differs from the latter in that it is generally in the shape of a bowl as opposed to an inverted pot top. Accordingly, when the mold 34" is spun, excess plastisol collects as at 100' similar to the manner in which the excess 100 collects in FIGS. 9 and 10. Then, when rotation of the mold 34" is terminated and the mold 34" is inverted in the manner illustrated in FIG. 14, the excess plastisol at 100' flows downwardly by gravity into the rolled rim 38' and tapers from the bead 110' upwardly toward the maximum diameter portion of the mold 34' as at 102'. Of course, the slot or opening 44' for the heating housing 42' to be used in conjunction with the mold 34" is larger than the opening or slot 44. Also, after the article 106' has been displaced upwardly from the mold 34" by air pressure therein, see FIG. 15, a manually or mechanically actuated implement 108' may be used to break the bead 110' of the article 106' from the mold 34". The finished article 106' is illustrated in FIG. 16.

Figure 17:
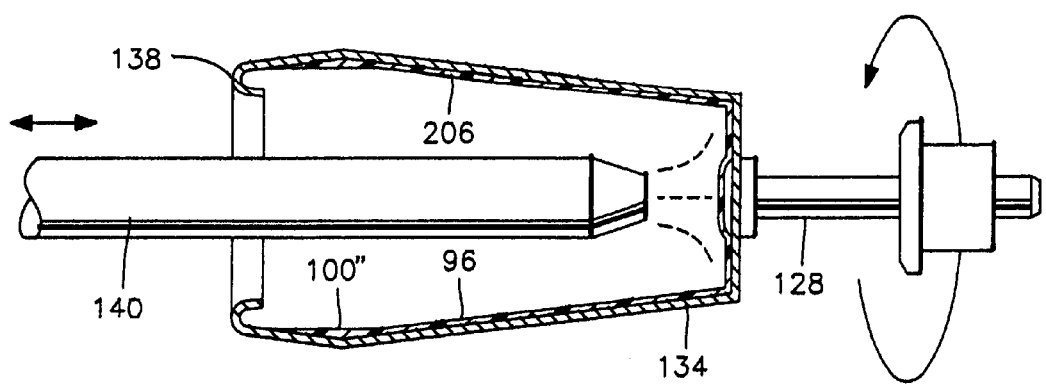
FIG. 17 illustrates a third shape of mold and the manner in which the mold interior may be initially coated with liquid PVC while the mold is being rotated about a horizontal axis.
Figure 18:
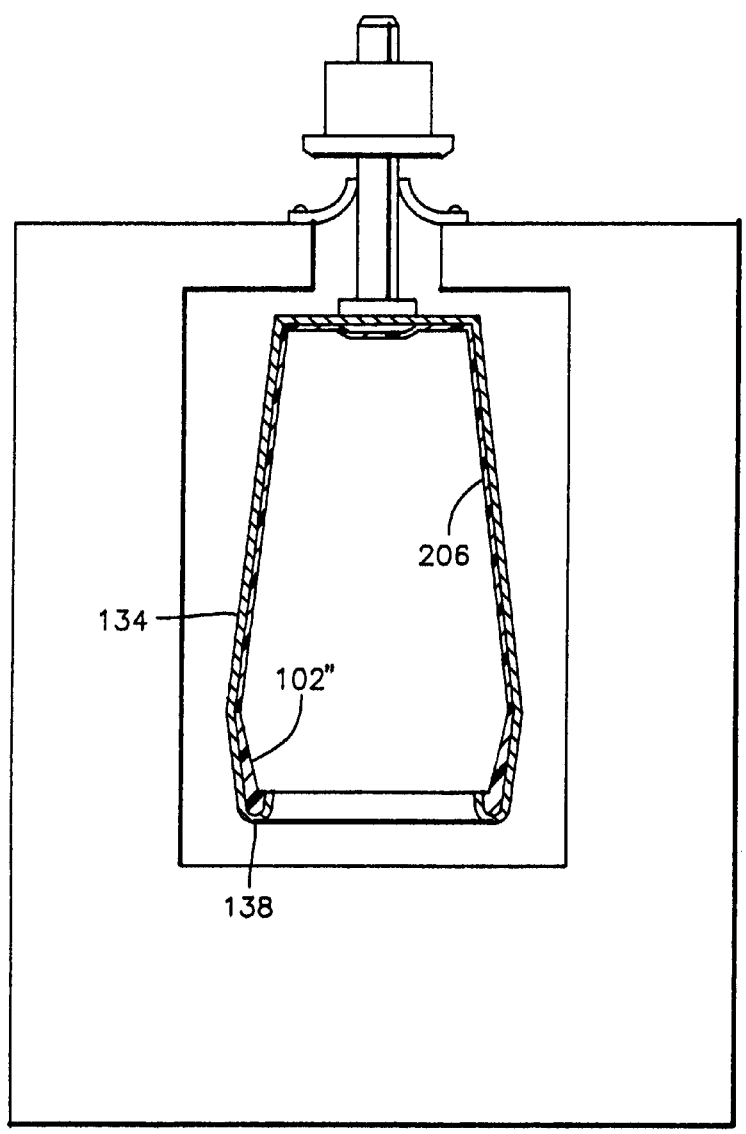
FIG. 18 is a vertical sectional schematic view illustrating the mold shown in FIG. 17 in inverted position for curing the material therein as it passes through the heating housing in an inverted position.

With attention now invited more specifically more specifically to FIG. 17, yet another form of mold 134 is disclosed and mounted upon a spindle 128 which is horizontally disposed. The plastisol 96 is injected into the mold 134 from a nozzle 140 and the spindle 128 is rotated so that the initial excess plastisol at 100" collects at the largest diameter portion of the mold 134. Then, rotation of the mold is terminated and the mold is inverted in a position similar to that illustrated in FIG. 18, whereupon the excess plastisol at 100" flows down into the rolled rim 138 and forms a tapered thickness at 102" of the plastisol from the rolled rim 138 to the maximum diameter zone of the mold 134.

When the mold 134 is used, the upper reach of the attendant conveyor chain must be guidingly twisted approximately 90° and the attendant belt and belt drive assembly for rotating the spindle also must be rotated 90°. Furthermore, the discharge nozzle 140 must be mounted for movement with the spindle 128 during the plastisol injection process and also mounted for longitudinal rectilinear displacement so that the nozzle 140 can be introduced into the mold 134 and subsequently extracted therefrom. This of course also applies to the plastisol discharge nozzle 40' illustrated in FIG. 13.

Figure 20:
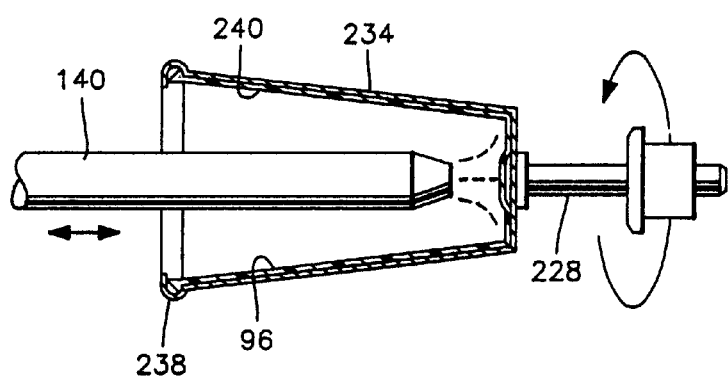
FIG. 20 is a vertical schematic view similar to FIG. 17, but illustrating a slightly different shaped mold for forming a liner for a tapered container.

With attention now invited more specifically FIG. 20, a final form of mold is designated by the reference numeral 234 and may be supported from a rotary spindle 228 similar to the rotary spindle 128. The mold 234 constantly tapers from its large diameter end to its small diameter end and, therefore, need not be rotated to an inverted position. The plastisol 96 injected into the mold 234 is spun by centrifugal force fully the length of the mold 234 to the rim 238 thereof. Thereafter, mold 234 may be moved through a horizontal side-slotted heating housing (not shown) and subsequently through a similar cooling housing and then into horizontal registry with an air discharge nozzle (not shown) for injecting air through the spindle 228 and into the mold 234 exteriorly of the article formed by the plastisol 96 therein.

Figure 19:
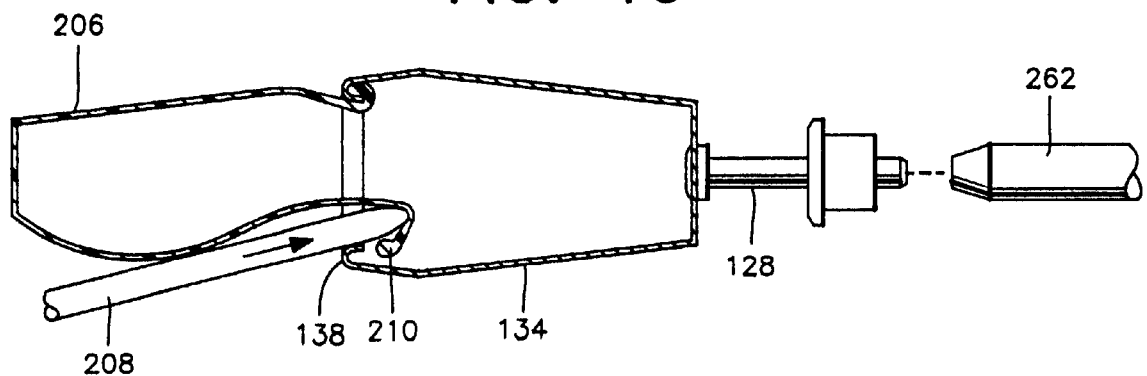
FIG. 19 a vertical schematic view illustrating the manner in which the article being formed in the mold illustrated in FIGS. 17 and 18 may be removed therefrom.

FIG. 19 illustrates the manner in which the article formed in the mold 134 or the article formed in the mold 234 may be displaced from the corresponding mold through the utilization of air injection from an air discharge nozzle 262. As the article 206 shown in FIG. 19 is displaced outwardly of the open end of the mold by the injected air, a manually or mechanically actuated implement 208 is utilized to break the bead 210 of the article 206 from the rolled rim 138. Thereafter, the article 206 may be manually removed from engagement with the mold 134. Of course, the article formed in the mold 234 may be removed therefrom in the same manner.

Figure 21:
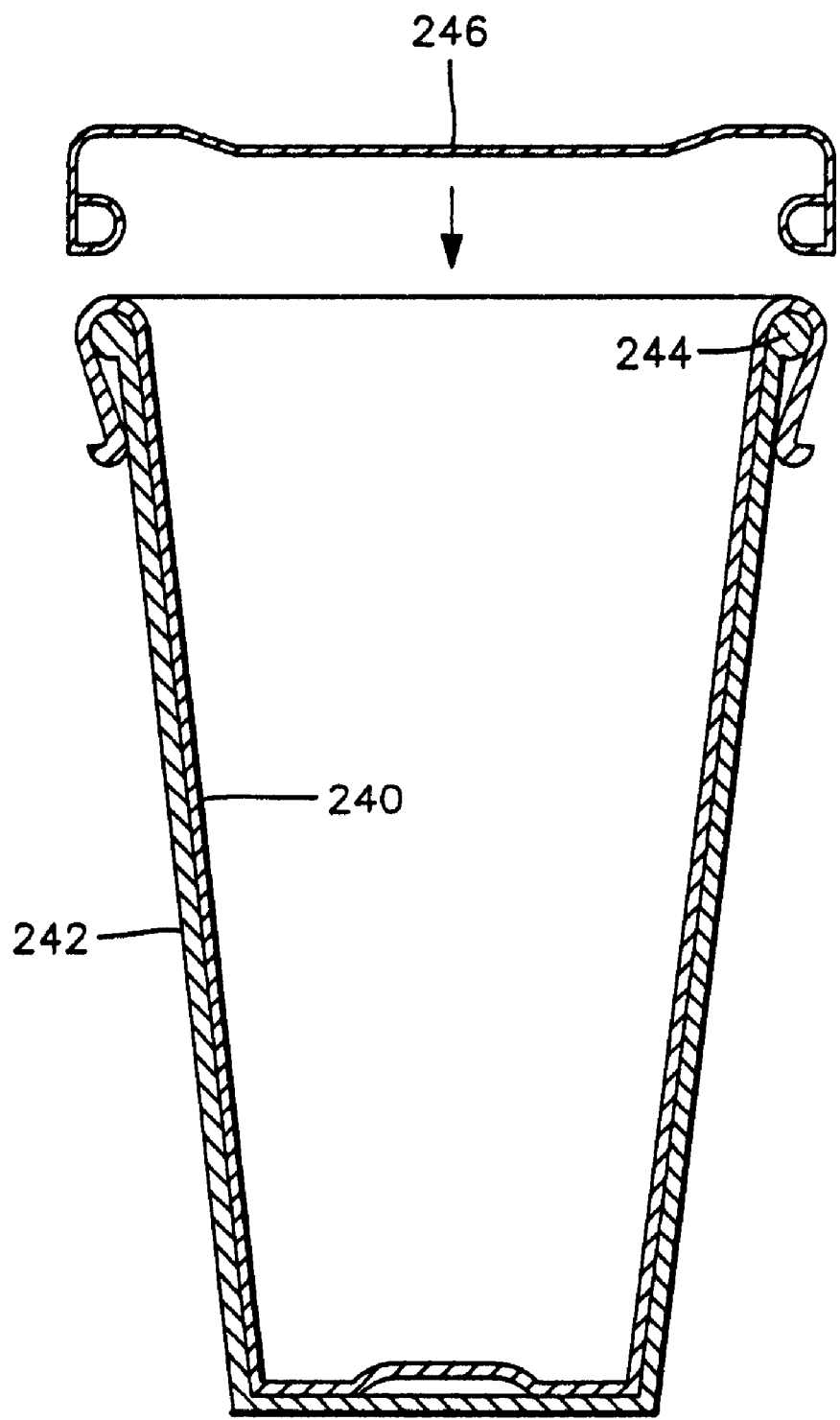
FIG. 21 is a vertical sectional view illustrating the manner in which the liner formed in the mold illustrated in FIG. 20 may be placed within a paper or plastic container and have a conventional cover snapped downwardly over the combination of the tapered container and liner.

Each article 206 (formed in the mold 134) and 240 (formed in the mold 234) may be utilized as a liner for a conventional tapered container 242 (see FIG. 21). The article 240 is illustrated in FIG. 21 as received within the container 242 and with the open end of the article 240 rolled back over and downwardly from the upper rim 244 exteriorally of the container 242. A conventional lid 246 then may be placed downwardly over the open upper end of the container 242 in the conventional manner, the thinness of the liner or article 240 passing about the rim 244 offering little resistance to engagement of the lid 246 downwardly over the open upper end of the container 242 and the article or liner 240.

Also, the article 206 after being removed from the mold 134, may be used as a liner for the container 242. The tapering portion 102" of the article 206, when the article 206 is placed within the container 242, being that portion of the open end of the article 206 that extends downwardly from the rim 244 of the container 242.

Figure 8:
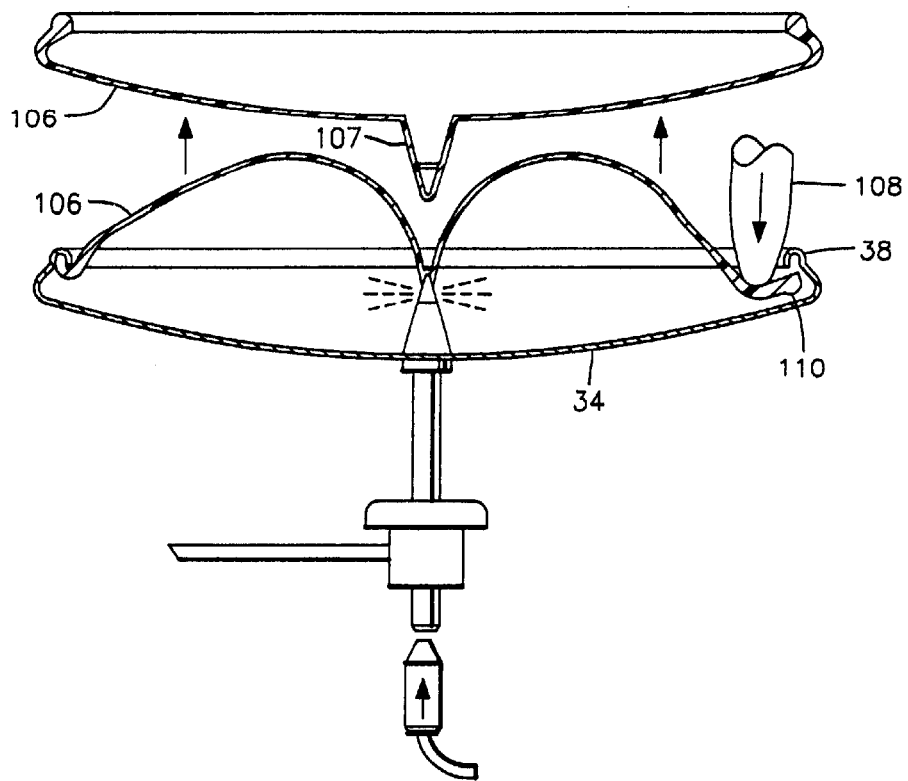
FIG. 8 is a schematic illustrating the manner in which a cover or closure is removed from the mold after the latter has been cooled.
Figure 22:
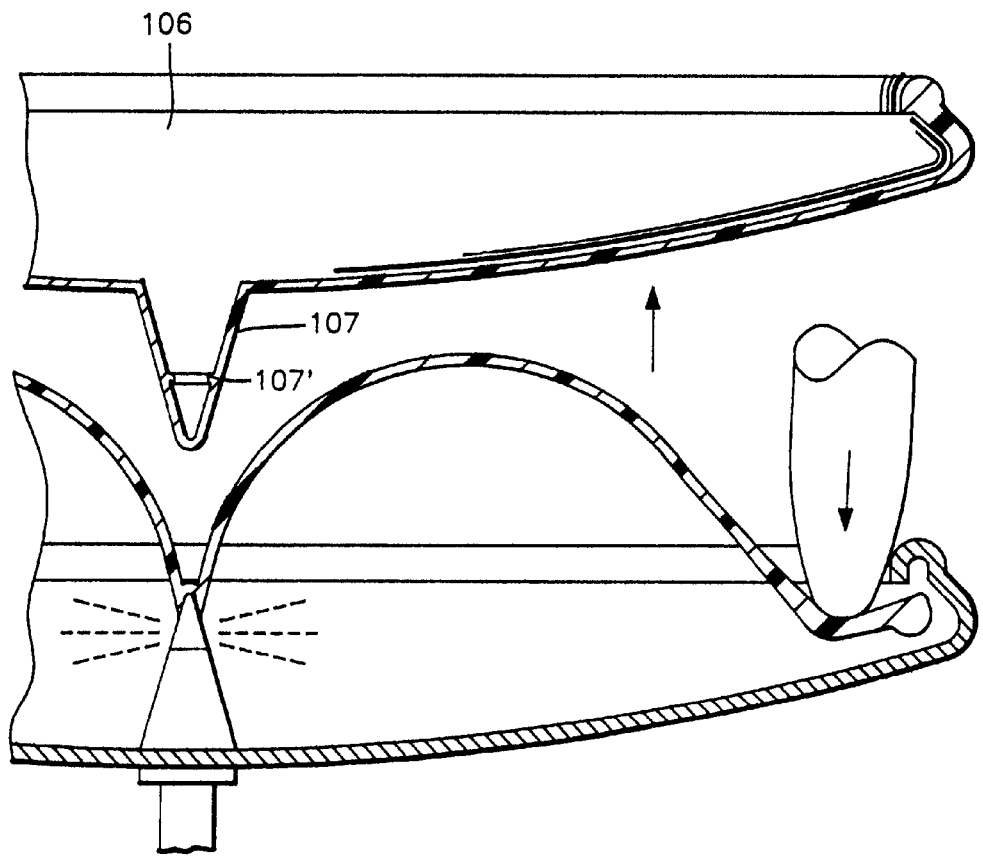
FIG. 22 is a fragmentary enlarged vertical sectional view of a cover removed from the mold of FIG. 8.

With reference now more specifically to FIG. 22 of the drawings, the article 106 extracted from the mold 34 in the manner illustrated in FIG. 8 includes the aforementioned conical portion 107 disposed to the exterior of the cover.

However, if the cover 106 is placed upon an open top food container with the conical portion 107 disposed to the exterior of the cover 106 and placed within a cool environment such as the interior of a refrigerator any air within the container will contract upon becoming cooled and the conical portion 107 will, by greater exterior air pressure be inverted to a position within the cover 106.

The narrow groove 107' (see FIG. 22) formed by the groove 112 indicates an area of the conical portion 107 which may be clipped therefrom if the covered container is to breathe.

Figure 23:
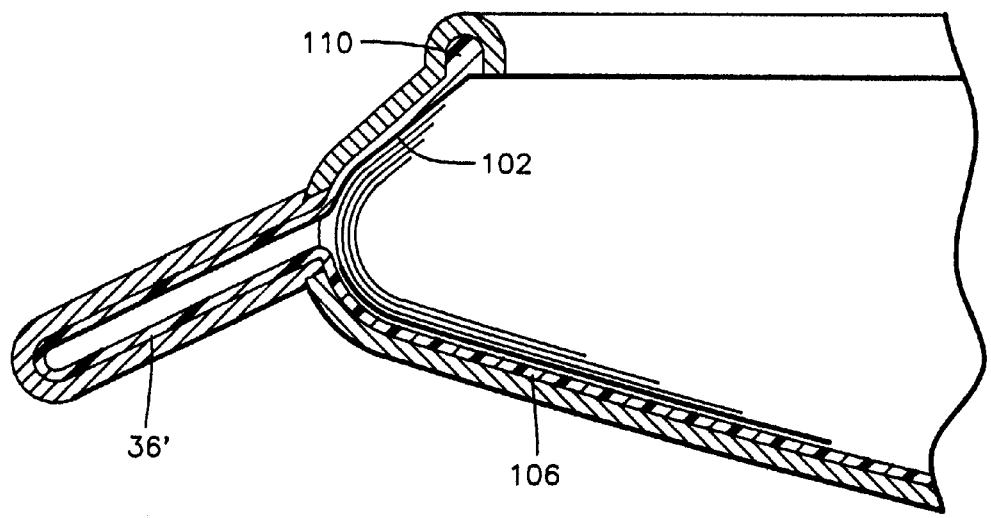
FIG. 23 is a fragmentary enlarged vertical sectional view of a cover removed from the mold of FIG. 2.

With attention now invited more specifically to FIG. 23, it may be seen that the cover 106 also includes a hollow peripheral nipple 36' formed in the nipple 36 (see FIG. 2). The nipple 36' may be maintained closed and utilized in manually assisting removal of the cover 106 from the mold 34. On the other hand, inasmuch as the wall thickness of the nipple 36' is very thin, the extreme outer end of the nipple 36' may be cut therefrom. Then, when the cover 106 is stretch over the open top of a container, the tubular nipple 36' will serve as a vent to allow escape of excess air pressure from within the container, but the thinness of the walls of the nipple 36' will allow the latter to droop downwardly when air pressure inside and outside the cover 106 is equal in order to prevent dust or other atmospheric contamination from entering a container over whose open end the cover 106 is secured.

It is also pointed out that the gradual thickening of the wall of the cover adjacent and away from the bead 110 as at 102 further reinforces the open marginal portion of the cover 106 in addition to the reinforcement thereof provided by the bead 110.

With attention now invited again to FIGS. 13 through 16, when using the mold 34", as an example only, it is to be understood that the liquid PVC may be injected into the mold 34" as it is rotated generally in the same manner illustrated in FIG. 13, but with the mold 34" and the nozzle 40' inverted. The liquid PVC is discharged into the inverted mold 34" with the nozzle 40' spaced very close to the closed upper end of the inverted mold 34" and only a prescribed amount of liquid PVC is dispensed upwardly on to the opposing center surface of the mold 34". Because the mold 34" is rotating, the liquid PVC immediately moves outwardly and is retained against the inner surface of the mold 34" by surface tension with the result that the excess PVC 100' collects in the maximum diameter portion of the mold 34" in the same manner as illustrated in FIG. 13. Then, with the mold 34" still inverted, rotation of the mold 34" is terminated and the excess liquid PVC is allowed to flow downward by gravity into the reversely turned rim 38'.

By using this method of forming the article or cover 106', the end result is the same as that illustrated in FIG. 16. The article or cover 106 is removed from the mold 34" in the same manner as that illustrated in FIG. 15, but with the mold 34" inverted to a downwardly opening position and it is therefore unnecessary to carry the spindle 28 on a chain such as the conveyor chain illustrated in FIG. 1. Rather, a plurality of spindles 28 may be carried by a rotating turret and the heating and cooling housings may be made arcuate so as to accommodate the movement of the spindles 28 through a circular path.

However, it is important to note that in each disclosed manner of forming the various disclosed covers or articles in the various disclosed molds the liquid PVC is applied to what might be termed concave inner surfaces of a mold as opposed to the outer surfaces of a mold. By using such an internal mold cavity as opposed to external mold surfaces, covers of more varying shapes may be formed. Furthermore, because internal mold cavities used, greater rotational speeds of the molds may be used since there is no chance of excess liquid PVC material being spun from outer surfaces of the mold.

The foregoing is considered as illustrative only of the principles of the invention. Further, since numerous other modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. An object cover including a thin, flexible body of PVC, said body including a central body portion of generally circular plan shape having a first side facing in one direction and an outer peripheral portion directed in said one direction and terminating outwardly in a thickened, non-rolled peripheral reinforcement bead, said outer peripheral portion, at least adjacent said bead, gradually thickening toward said bead.

2. The object cover of claim 1, wherein said central body portion is generally planar.

3. The object cover of claim 1, wherein said central body portion is dome-shaped in elevation.

4. The object cover of claim 1, wherein said central body portion is generally planar and said outer peripheral portion is generally frusto-conical with its large diameter portion opening in said one direction.

5. The object cover of claim 1, wherein said central body portion is generally planar and said outer peripheral portion is generally frusto-conical and merges, at its large diameter end, into an axially short reverse tapering frusto-conical portion from whose minor diameter end said bead is supported.

6. The object cover of claim 1, wherein said central body portion is concave and opens in said direction.

7. The object cover of claim 1, wherein said central body portion is approximately 0.0025 inches thick.

8. An object cover including a thin, flexible body of PVC, said body including a central body portion of generally circular plan shape having a first side facing in one direction and an outer peripheral portion directed in said one direction and terminating outwardly in a thickened, non-rolled peripheral reinforcement bead, said outer peripheral portion including a generally radially outwardly projecting nipple.

9. The object cover of claim 8, wherein said nipple is tubular in construction and includes a closed outer end.

10. An object cover including a thin, flexible body of PVC, said body including a central body portion of generally circular plan shape having a first side facing in one direction and an outer peripheral portion directed in said one direction and terminating outwardly in a thickened, non-rolled peripheral reinforcement bead, the central area of said central body portion including a thin, downwardly opening, hollow upstanding conical portion.

\* \* \* \* \*